(12) United States Patent
Mei

(10) Patent No.: US 10,740,607 B2
(45) Date of Patent: Aug. 11, 2020

(54) METHOD FOR DETERMINING TARGET THROUGH INTELLIGENT FOLLOWING OF UNMANNED AERIAL VEHICLE, UNMANNED AERIAL VEHICLE AND REMOTE CONTROL

(71) Applicant: AUTEL ROBOTICS CO., LTD., Shenzhen, Guangdong (CN)

(72) Inventor: Jiangyuan Mei, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 276 days.

(21) Appl. No.: 15/980,051

(22) Filed: May 15, 2018

(65) Prior Publication Data

US 2019/0057244 A1 Feb. 21, 2019

Related U.S. Application Data

(63) Continuation of application No. PCT/CN2018/078582, filed on Mar. 9, 2018.

(30) Foreign Application Priority Data

Aug. 18, 2017 (CN) .......................... 2017 1 0714275

(51) Int. Cl.
*G06K 9/00* (2006.01)
*G06K 9/66* (2006.01)
(Continued)

(52) U.S. Cl.
CPC .......... *G06K 9/0063* (2013.01); *B64C 39/024* (2013.01); *G05D 1/0094* (2013.01);
(Continued)

(58) Field of Classification Search
CPC ...... G06K 9/0063; G06K 9/2081; G06K 9/66; B64C 39/024; G05D 1/0094; G05D 1/12; G06N 3/0454; G06N 3/08; G06N 7/005
See application file for complete search history.

(56) References Cited

U.S. PATENT DOCUMENTS 6,097,522 A * 8/2000 Maerki ................ H04B 10/118
398/1
9,609,288 B1 3/2017 Richman et al.
(Continued)

FOREIGN PATENT DOCUMENTS

CN 106156807 A 11/2016
CN 106228158 A 12/2016
(Continued)

OTHER PUBLICATIONS

"Classification of Urban Aerial Data Based on Pixel Labelling with Deep Convolutional Neural Networks and Logistic Regression", Remote Sensing and Spatial Information Sciences, vol. XLI-B7, 2016, XXIII IS PRS Congress, Yao et al.*
(Continued)

*Primary Examiner* — Qun Shen

(57) ABSTRACT

The present invention discloses a method for determining a target through intelligent following of an unmanned aerial vehicle. The method includes: obtaining an image returned by an unmanned aerial vehicle; obtaining, according to a click of a user on the image returned by the unmanned aerial vehicle, a region picture in which the user is interested; loading a deep learning network model, inputting the obtained region picture to the deep learning network model, and outputting, by using the deep learning network model, a plurality of candidate circumscribed frames for framing targets in the region picture and probabilities that the targets in the candidate circumscribed frames belong to preset categories; and determining, according to the candidate
(Continued)

---

An electronic device obtains an image returned by an unmanned aerial vehicle — 101

The electronic device obtains, according to a click of a user on the image returned by the unmanned aerial vehicle, a region picture in which the user is interested — 102

The electronic device loads a deep learning network model, inputs the obtained region picture to the deep learning network model, and outputs, by using the deep learning network model, a plurality of candidate circumscribed frames for framing targets in the region picture and probabilities that the targets in the candidate circumscribed frames belong to preset categories — 103

Determine, according to the candidate circumscribed frames and the probabilities that the targets in the candidate circumscribed frames belong to the preset categories, whether a target image exists in the region picture; and send a target following command to the unmanned aerial vehicle if a target image exists — 104 circumscribed frames and the probabilities that the targets in the candidate circumscribed frames belong to the preset categories, whether a target image exists in the region picture. The present invention has a small calculation amount, a short operation time, and low requirements on hardware devices.

18 Claims, 7 Drawing Sheets

(51) Int. Cl.
*G06K 9/20* (2006.01)
*G06K 9/62* (2006.01)
*B64C 39/02* (2006.01)
*G06N 7/00* (2006.01)
*G06N 3/08* (2006.01)
*G05D 1/12* (2006.01)
*G05D 1/00* (2006.01)
*G06N 3/04* (2006.01)

(52) U.S. Cl.
CPC ............ *G05D 1/12* (2013.01); *G06K 9/2081* (2013.01); *G06K 9/6277* (2013.01); *G06K 9/66* (2013.01); *G06N 3/0454* (2013.01); *G06N 3/08* (2013.01); *G06N 7/005* (2013.01); *B64C 2201/027* (2013.01); *B64C 2201/108* (2013.01); *B64C 2201/146* (2013.01); *G06K 2209/21* (2013.01)

(56) References Cited

U.S. PATENT DOCUMENTS

| | | | |
|---|---|---|---|
| 10,185,891 B1* | 1/2019 | Martin | G06K 9/6218 |
| 2017/0024899 A1 | 1/2017 | Hammoud et al. | |
| 2017/0068246 A1 | 3/2017 | Zang | |
| 2017/0068867 A1* | 3/2017 | Lee | G06K 9/00449 |
| 2017/0102699 A1 | 4/2017 | Anderson | |
| 2017/0206648 A1 | 7/2017 | Marra et al. | |
| 2017/0360402 A1* | 12/2017 | de Jonge | A61B 8/52 |
| 2018/0005079 A1* | 1/2018 | Tosic | G06K 9/00664 |
| 2018/0060648 A1* | 3/2018 | Yoo | G06K 9/00899 |
| 2018/0129913 A1* | 5/2018 | Vauchier | B64C 39/024 |
| 2018/0165577 A1* | 6/2018 | Young | G06N 3/08 |
| 2018/0218254 A1* | 8/2018 | Feng | G06N 3/0454 |
| 2018/0292825 A1* | 10/2018 | Smolyanskiy | G05D 1/0242 |
| 2019/0259170 A1* | 8/2019 | Qi | G06T 7/73 |

FOREIGN PATENT DOCUMENTS

| | | |
|---|---|---|
| CN | 106709456 A | 5/2017 |
| CN | 106780612 A | 5/2017 |

OTHER PUBLICATIONS

Google Scholar Search Results.*
International Search Report dated Jun. 1, 2018; PCT/CN2018/078582.
European Search Report dated Jan. 24, 2019; Appln. No. EP18717495.
First Chinese Office Action dated Apr. 17, 2020; Appln. No. 201710714275.5.

* cited by examiner

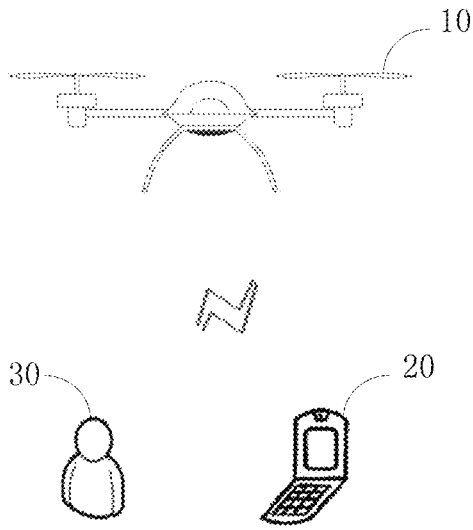

FIG. 1

```
┌─────────────────────────────────────────────────┐
│ An electronic device obtains an image returned  │── 101
│ by an unmanned aerial vehicle                   │
└─────────────────────────────────────────────────┘
                        │
┌─────────────────────────────────────────────────┐
│ The electronic device obtains, according to a   │
│ click of a user on the image returned by the    │── 102
│ unmanned aerial vehicle, a region picture in    │
│ which the user is interested                    │
└─────────────────────────────────────────────────┘
                        │
┌─────────────────────────────────────────────────┐
│ The electronic device loads a deep learning     │
│ network model, inputs the obtained region       │
│ picture to the deep learning network model,     │
│ and outputs, by using the deep learning network │── 103
│ model, a plurality of candidate circumscribed   │
│ frames for framing targets in the region        │
│ picture and probabilities that the targets in   │
│ the candidate circumscribed frames belong to    │
│ preset categories                               │
└─────────────────────────────────────────────────┘
                        │
┌─────────────────────────────────────────────────┐
│ Determine, according to the candidate           │
│ circumscribed frames and the probabilities that │
│ the targets in the candidate circumscribed      │
│ frames belong to the preset categories, whether │── 104
│ a target image exists in the region picture;    │
│ and send a target following command to the      │
│ unmanned aerial vehicle if a target image       │
│ exists                                          │
└─────────────────────────────────────────────────┘
```

FIG. 2

METHOD FOR DETERMINING TARGET THROUGH INTELLIGENT FOLLOWING OF UNMANNED AERIAL VEHICLE, UNMANNED AERIAL VEHICLE AND REMOTE CONTROL

CROSS REFERENCE

This application is a continuation of International Application No. PCT/CN2018/078582, filed on Mar. 9, 2018, which claims priority to Chinese Patent Application No. 201710714275.5 filed on Aug. 18, 2017, both of which are incorporated herein by reference in its entirety.

TECHNICAL FIELD

Embodiments of the present invention relate to the field of computer vision, and in particular, to a method for determining a target through intelligent following of an unmanned aerial vehicle, an unmanned aerial vehicle and a remote control.

RELATED ART

With development of unmanned aerial vehicle technologies, unmanned aerial vehicles are widely applied to both military and civil fields. As the unmanned aerial vehicles are applied increasingly widely, new requirements on performance of the unmanned aerial vehicles particularly, requirements on intelligentization are also continuously put forward. Vision-based unmanned aerial vehicle intelligent following is one of key functions of an intelligentized unmanned aerial vehicle, and is also importantly applied to industries. In the field of consumer-level unmanned aerial vehicles, an intelligent following function is one of important symbols of a high-end unmanned aerial vehicle, and brings about many pleasures for users; in the field of industry-level unmanned aerial vehicles, intelligent following may be used to track an escaped criminal, analyze an abnormal target behavior, and so on, and has an important significance for nation security, public security and stability maintenance.

In intelligent following technologies, how to initialize a target photographed by an unmanned aerial vehicle is always one of puzzles of intelligent following. If a target cannot be accurately framed, the target is lost very easily in a subsequent tracking process. Currently, framing and recognition of a dynamic target are generally completed by using a deep-learning based target detection algorithm. By means of the deep-learning based target detection algorithm, target recognition and positioning processes may be completed in a uniform deep learning framework, positioning is accurate, and many types may be recognized.

During implementation of the present invention, the inventor finds that related technologies have at least the following problems: a calculation amount of the deep-learning based target detection algorithm is large, one picture prediction process needs to cost one billion of or even ten billions of times of floating-point operations, and if a general processor is adopted, a quite long operation time is caused, and it is very difficult to meet a real-time requirement. Therefore, requirements on the processor are relatively high.

SUMMARY

Embodiments of the present invention are to provide a method for determining a target through intelligent following of an unmanned aerial vehicle, an unmanned aerial vehicle and a remote control that have a small algorithm calculation amount, a short operation time, and low requirements on hardware devices.

According to a first aspect, an embodiment of the present invention provides a method for determining a target through intelligent following of an unmanned aerial vehicle. The method includes:

obtaining, by the electronic device, an image returned by an unmanned aerial vehicle;

obtaining, by the electronic device according to a click of a user on the image returned by the unmanned aerial vehicle, a region picture in which the user is interested;

loading, by the electronic device, a deep learning network model, inputting the obtained region picture to the deep learning network model, and outputting, by using the deep learning network model, a plurality of candidate circumscribed frames for framing targets in the region picture and probabilities that the targets in the candidate circumscribed frames belong to preset categories;

determining, according to the candidate circumscribed frames and the probabilities that the targets in the candidate circumscribed frames belong to the preset categories, whether a target image exists in the region picture; and sending a target following command to the unmanned aerial vehicle if a target image exists.

Optionally, the method further includes: reminding, by the electronic device if no target image exists, the user that no target in which the user is interested exists in the image.

Optionally, the method further includes: reminding, by the electronic device if no target image exists, the user to re-click the image to reselect a target in which the user is interested.

Optionally, the determining, according to the candidate circumscribed frames and the probabilities that the targets in the candidate circumscribed frames belong to the preset categories, whether the target image exists in the region picture includes:

S1: for each of the preset categories, obtaining a candidate circumscribed frame corresponding to a target whose probability of belonging to the preset categories is maximum, separately calculating overlapping rates of other candidate circumscribed frames relative to the candidate circumscribed frame, and setting a probability that a target in a candidate circumscribed frame whose overlapping rate is greater than a first preset threshold belongs to the preset categories to zero;

S2: for other preset categories, repeating step S1;

S3: for each candidate circumscribed frame remaining after executing step S2, obtaining a preset category corresponding to a maximum probability of probabilities that a target in the candidate circumscribed frame belongs to the preset categories to serve as a category of the target in the candidate circumscribed frame, and using a target whose maximum probability is greater than a second preset threshold as a possible target image;

S4: calculating a distance coefficient of the possible target image relative to a click location of the user, where the distance coefficient $\delta$ is represented as:

$$\delta = \begin{cases} \min\left(10/\sqrt{(x_p - x_o)^2 + (y_p - y_o)^2}, 1\right) & \text{if } (x_p, y_p) \text{ is in a candidate circumscribed frame} \\ 5/\sqrt{(x_p - x_o)^2 + (y_p - y_o)^2} & \text{if } (x_p, y_p) \text{ is out of a candidate circumscribed frame} \end{cases}$$

where coordinate of the possible target image is $(x_o, y_o)$, and coordinate of the click location is $(x_p, y_p)$; and S5, obtaining products of distance coefficients of possible target images and probabilities corresponding to categories of the possible target images and finding a maximum value of the products; and if the maximum value is greater than a third preset threshold, using a possible target image corresponding to the maximum value of the products as the target image, and recording a category of the target image.

Optionally, the deep learning network model includes at least two convolutional layers and at least two sampling layers.

Optionally, the deep learning network model sequentially includes:

a first convolutional layer, a first downsampling layer, a second convolutional layer, a second downsampling layer, a third convolutional layer, a third downsampling layer, a fourth convolutional layer, a fourth downsampling layer, a fifth convolutional layer, a fifth downsampling layer, a sixth convolutional layer, a sixth downsampling layer, a seventh convolutional layer, an eighth convolutional layer and a region layer.

Optionally, among the first convolutional layer, the second convolutional layer, the third convolutional layer, the fourth convolutional layer, the fifth convolutional layer and the sixth convolutional layer, a filter quantity of a next convolutional layer is two times a filter quantity of a previous convolutional layer, and a filter quantity of the sixth convolutional layer is equal to that of the seventh convolutional layer; and the first downsampling layer, the second downsampling layer, the third downsampling layer, the fourth downsampling layer and the fifth downsampling layer have a window size of 2×2 pixels and a skip interval of 2, and the sixth downsampling layer has a window size of 2×2 pixels and a skip interval of 1.

Optionally, a filter quantity of the first convolutional layer is 4, and a maximum downsampling method is adopted for all of the first downsampling layer, the second downsampling layer, the third downsampling layer, the fourth downsampling layer, the fifth downsampling layer and the sixth downsampling layer.

Optionally, a filter of 3×3 pixels is used for each of the convolutional layers.

Optionally, the region picture has a size of 288×288 pixels, and totally 9×9×5 candidate circumscribed frames are obtaining by using the deep learning network model.

According to a second aspect, an embodiment of the present invention provides a method for determining a target through intelligent following of an unmanned aerial vehicle. The method includes:

obtaining, by the unmanned aerial vehicle, an image;

obtaining, by the unmanned aerial vehicle according to a click operation of a user, a region picture in which the user is interested;

loading, by the unmanned aerial vehicle, a deep learning network model, inputting the obtained region picture to the deep learning network model, and outputting, by using the deep learning network model, a plurality of candidate circumscribed frames for framing targets in the region picture and probabilities that the targets in the candidate circumscribed frames belong to preset categories;

determining, according to the candidate circumscribed frames and the probabilities that the targets in the candidate circumscribed frames belong to the preset categories, whether a target image exists in the region picture; and following the target if a target image exists.

Optionally, the method further includes: sending, by the unmanned aerial vehicle if no target image exists, an instruction to an electronic device, where the instruction is used to remind the user that no target in which the user is interested exists in the image.

Optionally, the instruction is further used to remind the user to re-click the image to reselect a target in which the user is interested.

Optionally, the determining, according to the candidate circumscribed frames and the probabilities that the targets in the candidate circumscribed frames belong to the preset categories, whether the target image exists in the region picture includes:

S1: for each of the preset categories, obtaining a candidate circumscribed frame corresponding to a target whose probability of belonging to the preset categories is maximum, separately calculating overlapping rates of other candidate circumscribed frames relative to the candidate circumscribed frame, and setting a probability that a target in a candidate circumscribed frame whose overlapping rate is greater than a first preset threshold belongs to the preset categories to zero;

S2: for other preset categories, repeating step S1;

S3: for each candidate circumscribed frame remaining after executing step S2, obtaining a preset category corresponding to a maximum probability of probabilities that a target in the candidate circumscribed frame belongs to the preset categories to serve as a category of the target in the candidate circumscribed frame, and using a target whose maximum probability is greater than a second preset threshold as a possible target image;

S4: calculating a distance coefficient of the possible target image relative to a click location of the user, where the distance coefficient $\delta$ is represented as:

$$\delta = \begin{cases} \min\left(10/\sqrt{(x_p - x_o)^2 + \sqrt{(y_p - y_o)^2}}, 1\right) & \text{if } (x_p, y_p) \text{ is in a candidate image} \\ 5/\sqrt{(x_p - x_o)^2 + \sqrt{(y_p - y_o)^2}} & \text{if } (x_p, y_p) \text{ is out of a candidate image} \end{cases}$$

where coordinate of the possible target image is $(x_o, y_o)$, and coordinate of the click location is $(x_p, y_p)$; and S5, obtaining products of distance coefficients of possible target images and probabilities corresponding to categories of the possible target images and finding a maximum value of the products; and if the maximum value is greater than a third preset threshold, using a possible target image corresponding to the maximum value of the products as the target image, and recording a category of the target image.

Optionally, the deep learning network model includes at least two convolutional layers and at least two sampling layers.

Optionally, the deep learning network model sequentially includes:

a first convolutional layer, a first downsampling layer, a second convolutional layer, a second downsampling layer, a third convolutional layer, a third downsampling layer, a fourth convolutional layer, a fourth downsampling layer, a fifth convolutional layer, a fifth downsampling layer, a sixth convolutional layer, a sixth downsampling layer, a seventh convolutional layer, an eighth convolutional layer and a region layer.

Optionally, among the first convolutional layer, the second convolutional layer, the third convolutional layer, the fourth convolutional layer, the fifth convolutional layer and the sixth convolutional layer, a filter quantity of a next convolutional layer is two times a filter quantity of a previous convolutional layer, and a filter quantity of the sixth convolutional layer is equal to that of the seventh convolutional layer; and the first downsampling layer, the second downsampling layer, the third downsampling layer, the fourth downsampling layer and the fifth downsampling layer have a window size of 2×2 pixels and a skip interval of 2, and the sixth downsampling layer has a window size of 2×2 pixels and a skip interval of 1.

Optionally, a filter quantity of the first convolutional layer is 4, and a maximum downsampling method is adopted for all of the first downsampling layer, the second downsampling layer, the third downsampling layer, the fourth downsampling layer, the fifth downsampling layer and the sixth downsampling layer.

Optionally, a filter of 3×3 pixels is used for each of the convolutional layers.

Optionally, the region picture has a size of 288×288 pixels, and totally 9×9×5 candidate circumscribed frames are obtaining by using the deep learning network model.

According to a third aspect, an embodiment of the present invention provides a remote control. The remote control includes:

an operating rod;

a signal receiver, configured to receive an image returned by an unmanned aerial vehicle;

a signal sender, configured to send an instruction to the unmanned aerial vehicle;

a display screen; and a processor, where the processor is configured to:

obtain, according to a click of a user on the image returned by the unmanned aerial vehicle, a region picture in which the user is interested;

load a deep learning network model, input the obtained region picture to the deep learning network model, and output, by using the deep learning network model, a plurality of candidate circumscribed frames for framing targets in the region picture and probabilities that the targets in the candidate circumscribed frames belong to preset categories;

determine, according to the candidate circumscribed frames and the probabilities that the targets in the candidate circumscribed frames belong to the preset categories, whether a target image exists in the region picture; and send, by using the signal sender, a target following command to the unmanned aerial vehicle if a target image exists.

Optionally, if no target image exists, the display screen displays a reminder that no target in which the user is interested exists in the image.

Optionally, if no target image exists, the display screen displays a reminder of re-clicking the image to reselect a target in which the user is interested.

Optionally, the processor is further configured to perform the method according to any item in the first aspect.

According to a fourth aspect, an embodiment of the present invention provides an unmanned aerial vehicle, including a vehicle body, an arm connected to the vehicle body, a power apparatus disposed at the arm, an image sensor configured to obtain an image, a processor disposed in the vehicle body and a signal sender. The processor is configured to:

obtain, according to a click operation of a user, a region picture in which the user is interested;

load a deep learning network model, input the obtained region picture to the deep learning network model, and output, by using the deep learning network model, a plurality of candidate circumscribed frames for framing targets in the region picture and probabilities that the targets in the candidate circumscribed frames belong to preset categories;

determine, according to the candidate circumscribed frames and the probabilities that the targets in the candidate circumscribed frames belong to the preset categories, whether a target image exists in the region picture, and control the unmanned aerial vehicle to follow the target if a target image exists.

Optionally, the method further includes: if no target image exists, the unmanned aerial vehicle sends an instruction to an electronic device by using the signal sender, where the instruction is used to remind the user that no target in which the user is interested exists in the image.

Optionally, the instruction is further used to remind the user to re-click the image to reselect a target in which the user is interested.

Optionally, the processor is further configured to perform the method according to any item in the second aspect.

According to a fifth aspect, an embodiment of the present invention provides a non-volatile computer readable storage medium, where the computer readable storage medium stores a computer executable instruction, and when the computer executable instruction is executed by an electronic device, the electronic device is enabled to perform the method according to any item of the first aspect.

According to a sixth aspect, an embodiment of the present invention provides a non-volatile computer readable storage medium, where the computer readable storage medium stores a computer executable instruction, and when the computer executable instruction is executed by an unmanned aerial vehicle, the unmanned aerial vehicle is enabled to perform the method according to any item of the second aspect.

According to a seventh aspect, an embodiment of the present invention provides a computer program product, where the computer program product includes a computer program stored on a non-volatile computer readable storage medium, the computer program includes a program instruction, and when the program instruction is executed by an electronic device, the electronic device is enabled to perform the method according to the first aspect.

According to an eighth aspect, an embodiment of the present invention provides a computer program product, where the computer program product includes a computer program stored on a non-volatile computer readable storage medium, the computer program includes a program instruction, and when the program instruction is executed by an unmanned aerial vehicle, the unmanned aerial vehicle is enabled to perform the method according to the second aspect.

Beneficial effects of the embodiments of the present invention are: According to the embodiments of the present invention, a region picture in which a user is interested is obtained on an original image according to a click location of the user, and the region picture in which the user is interested is input to a deep learning network model to perform target prediction, so that a calculation amount is small, an operation time is short, and requirements on hardware devices are low.

BRIEF DESCRIPTION OF THE DRAWINGS

Exemplary descriptions of one or more embodiments are provided through accompanying drawings corresponding to the one or more embodiments. These exemplary descriptions do not constitute any limitation on the embodiments. Elements having identical reference numerals in the drawings represent similar elements. Unless particularly stated, figures in the accompanying drawings do not constitute any proportional limitation.

FIG. 1 is a schematic diagram of an application scenario of a target determining method and apparatus according to an embodiment of the present invention;

FIG. 2 is a schematic flowchart of an embodiment of a target determining method according to the present invention performed by an electronic device;

DETAILED DESCRIPTION

Figure 3:
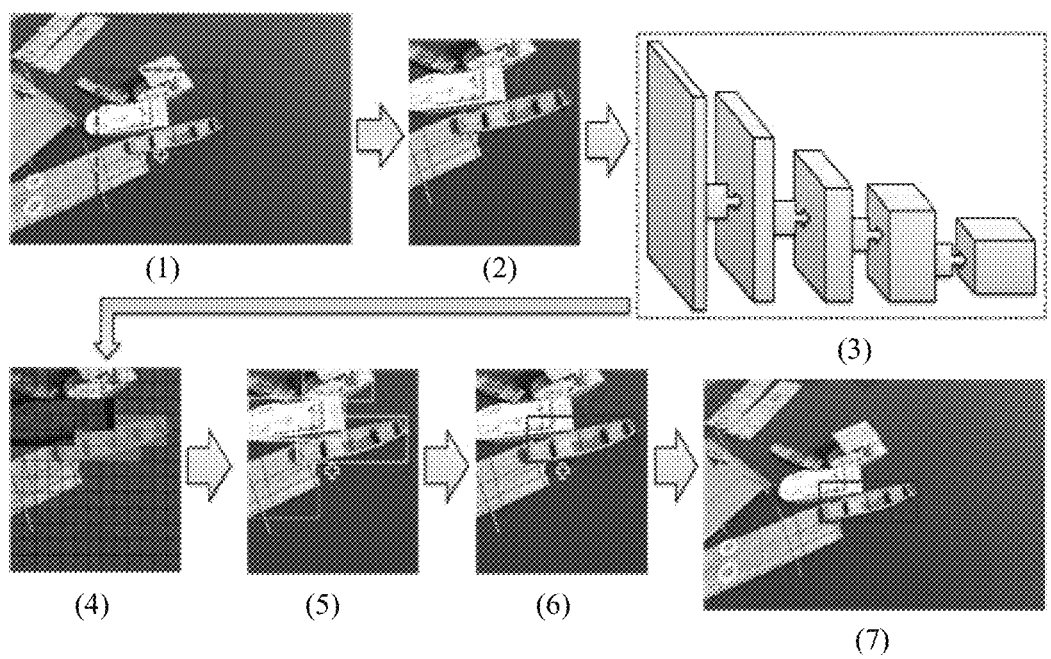
FIG. 3 is a schematic diagram of a process of an embodiment of a target determining method according to the present invention.

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A method and an apparatus for determining a target through intelligent following of an unmanned aerial vehicle that are provided in the embodiments of the present invention are applicable to an application scenario shown in FIG. 1. The application scenario includes an unmanned aerial vehicle 10, an electronic device 20 and a user 30. The unmanned aerial vehicle 10 may be any appropriate type of high-altitude or low-altitude aerial vehicle including a typical quadcopter, a remote control helicopter that can hover, a fixed-wing aerial vehicle having a movement speed or the like. The electronic device 20 may be, for example, a remote control, a smartphone, a tablet computer, a personal computer, or a portable computer. The user 30 may interact with the electronic device 20 by using one or more user interaction devices of any appropriate type. These user interaction devices may be a mouse, a key, a touch screen and the like. A communication connection may be established between the unmanned aerial vehicle 10 and the electronic device 20 by using wireless communications modules that are separately disposed internally, to upload or deliver data/instructions.

The unmanned aerial vehicle 10 may track a target, and the target is, for example, a particular person, automobile, ship or animal. To track the target, the unmanned aerial vehicle 10 needs to first determine the target. At least one image collection apparatus such as a high-definition camera or a motion video camera is disposed on the unmanned aerial vehicle 10 and configured to capture an image. The unmanned aerial vehicle 10 returns the image to the electronic device 20 by using a wireless network, and the electronic device 20 displays the image on a screen of the electronic device 20. The user 30 may perform an operation on the image, for example, click a target in which the user 30 is interested on the image, and the electronic device 20 determines, according to the click operation of the user 30, a location in the image and of the target in which the user 30 is interested.

A target in the captured image may be recognized and confirmed based on a deep learning network model, and if image recognition is performed on an entire original image, a calculation amount is relatively large. However, if a region picture in which the user 30 is interested is obtained on the original image according to a click location of the user 30 and then image recognition is performed for the region picture in which the user 30 is interested, a calculation amount is smaller and a recognition speed is higher. The region picture in which the user 30 is interested may be obtained by the electronic device 20 from the original image according to the click location of the user 30, and then target recognition is performed based on a deep learning algorithm for the region picture in which the user 30 is interested, to obtain a target image. In this embodiment, the deep learning network model is loaded at an end of the electronic device 20, target recognition and confirming are completed on the electronic device 20, and no computing resource of the unmanned aerial vehicle 10 is occupied, so as to add a new function to the unmanned aerial vehicle 10 without increasing any hardware cost of the unmanned aerial vehicle 10. In other possible embodiments, the deep learning network model may also be loaded at an end of the unmanned aerial vehicle 10, the electronic device 20 sends a region picture in which the user 30 is interested and a click location of the user 30 to the unmanned aerial vehicle 10, and the unmanned aerial vehicle 10 performs, based on the deep learning algorithm, target recognition on the region picture in which the user 30 is interested, to obtain a target image. The electronic device 20 may also send only a click location of the user 30 to the unmanned aerial vehicle 10, and the unmanned aerial vehicle 10 obtains, according to the click location, a region picture in which the user 30 is interested on the original image, and performs recognition based on the region picture in which the user 30 is interested.

FIG. 2 is a schematic flowchart of a method for determining a target through intelligent following of an unmanned aerial vehicle according to an embodiment of the present invention. The method may be performed by the electronic device 20 in FIG. 1. As shown in FIG. 2, the method includes the following steps:

101: The electronic device 20 obtains an image returned by an unmanned aerial vehicle 10.

After capturing an image, the unmanned aerial vehicle 10 sends the image to the electronic device 20, and after the electronic device 20 receives the image returned by the unmanned aerial vehicle 10, the image may be displayed on a screen of the electronic device 20.

102: The electronic device 20 obtains, according to a click operation of a user 30 on the image returned by the unmanned aerial vehicle 10, a region picture in which the user 30 is interested. The user 30 may click, on the screen of the electronic device 20, the image returned by the unmanned aerial vehicle 10, so as to determine a target that needs to be tracked, and the electronic device 20 may obtain, according to a click location of the user 30, the region picture in which the user 30 is interested. For example, corresponding coordinates $(x_p, y_p)$ of the click location on the image are determined according to coordinates $(x_m, y_m)$ of the click location of the user 30 on the screen, and the original image is tailored according to the coordinates $(x_p, y_p)$ to obtain a region picture in which the user is interested. Generally, the unmanned aerial vehicle 10 returns a picture of 1280×720 pixels, and a region picture in which the user is interested may be a region of 288×288 pixels using the coordinates $(x_p, y_p)$ as the center. Referring to FIG. 3, steps (1) and (2) show a process of obtaining a region picture in which the user is interested, where a tag "+" in the figure indicates a click location of the user 30, and a part framed by a dashed line frame is an obtained region picture in which the user is interested.

103: The electronic device 20 loads a deep learning network model, inputs the obtained region picture to the deep learning network model, and outputs, by using the deep learning network model, a plurality of candidate circumscribed frames for framing targets in the region picture and probabilities that the targets in the candidate circumscribed frames belong to preset categories.

Before target prediction is performed, a deep-learning based network model may be obtained in advance, which specifically includes:

using a plurality of pictures and preset categories corresponding to the pictures as inputs, performing model training based on a deep learning algorithm, and obtaining the deep-learning based network model and weight parameters in the network model. The preset categories are, for example, person; miniature car, small-sized car, mid-sized car and the like; bus, truck and the like; agricultural vehicle, tricycle, tractor and the like; cycling targets such as bike and motorcycle; waterborne targets such as ship; flight targets such as unmanned aerial vehicle; common pets such as cat and dog; other animals; and other conspicuous targets. A quantity of the preset categories may be any quantity such as 10.

Referring to FIG. 3, steps (3) and (4) in FIG. 3 show a process of predicting a region picture in which a user is interested based on a deep learning network model.

The region picture is input to the deep learning network model, a plurality of candidate circumscribed frames for framing all targets in the region picture is obtained, and a target in each candidate circumscribed frame has probabilities corresponding to preset categories. For example, a region picture of 288×288 pixels in which the user is interested is input to a deep-learning based network model shown in FIG. 5 and predicted, and 9×9×5×15 prediction results are output. 9×9×5 indicates a quantity of candidate circumscribed frames, "5" is obtained through training sample mean clustering, "15" represents parameters of each candidate circumscribed frame, which are separately 4 location parameters (including coordinates, a length and a width), 10 probability parameters corresponding to preset categories and 1 probability parameter of whether it is a target. The 405 candidate circumscribed frames provide a sufficient quantity from which a minimum circumscribed frame of an optimal target image is selected. The input image is set to have a resolution of 288×288, so as to improve a recognition speed on the basis of ensuring recognition precision.

Optionally, in some embodiments of the method, the deep-learning based network model includes at least two convolutional layers and at least two sampling layers. Specifically, the deep learning network model 300 shown in FIG. 5 may be adopted, and includes a 15-layer network structure, and the 15-layer network structure not only avoids excessive fitting in a case of an excessively large quantity of layers, but also avoids insufficient precision in a case of an excessively small quantity of layers, so as to optimize the deep learning network structure. The deep learning network model sequentially includes:

a first convolutional layer, a first downsampling layer, a second convolutional layer, a second downsampling layer, a third convolutional layer, a third downsampling layer, a fourth convolutional layer, a fourth downsampling layer, a fifth convolutional layer, a fifth downsampling layer, a sixth convolutional layer, a sixth downsampling layer, a seventh convolutional layer, an eighth convolutional layer and a region layer.

Figure 5:
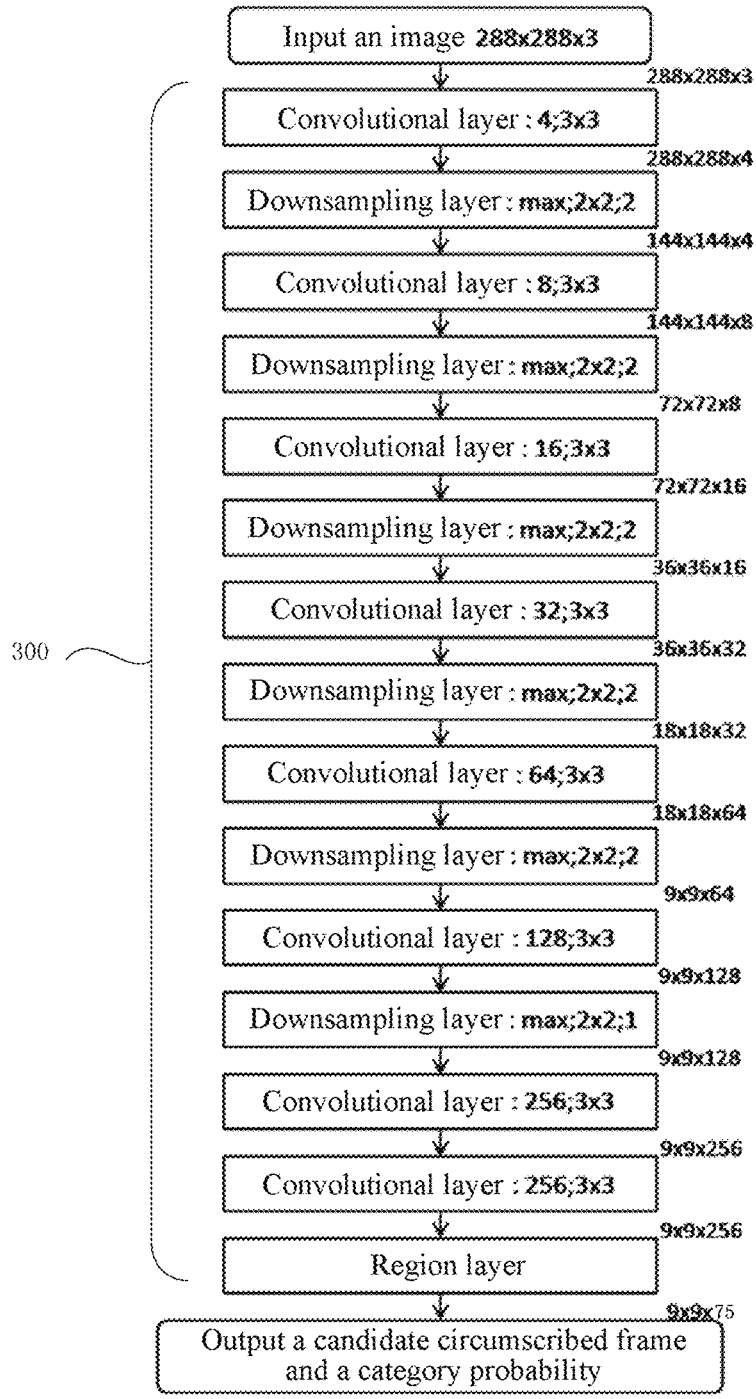
FIG. 5 is a schematic diagram of a network structure based on a deep learning algorithm according to an embodiment of the present invention.

Optionally, except the eighth convolutional layer, a filter quantity of a next convolutional layer is two times a filter quantity of a previous convolutional layer, and a filter quantity of the seventh convolutional layer is equal to that of the eighth convolutional layer. Referring to FIG. 5, if a filter quantity of the first convolutional layer is 4, filter quantities of subsequent convolutional layers are sequentially 8, 16, 32, 64, 128, 256, and 256.

The first downsampling layer, the second downsampling layer, the third downsampling layer, the fourth downsampling layer and the fifth downsampling layer have a window size of 2×2 pixels and a skip interval of 2, and the sixth downsampling layer has a window size of 2×2 pixels and a skip interval of 1.

Optionally, a filter of 3×3 pixels may be adopted for each convolutional layer, and the filter of 3×3 pixels has a relatively small calculation amount.

Optionally, a maximum downsampling method may be adopted for the first downsampling layer, the second downsampling layer, the third downsampling layer, the fourth downsampling layer, the fifth downsampling layer and the sixth downsampling layer.

Starting from 4 filters of the first convolutional layer, a filter quantity of a next convolutional layer is two times a filter quantity of a previous convolutional layer (except a last convolutional layer), and each time of passing through a convolutional layer, a characteristic quantity is doubled. A downsampling layer has a window size of 2×2 and a skip interval of 2 (except a last downsampling layer), and each time of passing through a downsampling layer, a characteristic resolution is halved. Such setting may combine changes in the resolution and the characteristic quantity, and a decrease in the resolution corresponds to an increase in the characteristic quantity.

104: Determine, according to the candidate circumscribed frames and the probabilities that the candidate circumscribed frames belong to the preset categories, whether a target image exists in the region picture; and send a target following command to the unmanned aerial vehicle 10 if a target image exists.

Optionally, in other embodiments of the method, if no target image exists, the electronic device 20 reminds the user 30 that no target in which the user is interested exists in the image. The electronic device 20 may further remind the user to re-click the image to reselect a target in which the user is interested.

Referring to FIG. 3, steps (5), (6) and (7) in FIG. 3 show a process of confirming a target image. The confirming whether a target image exists in the region picture specifically includes the following steps:

Step 1: For each of the preset categories, obtain a candidate circumscribed frame corresponding to a target whose probability of belonging to the preset categories is maximum, separately calculate overlapping rates of other candidate circumscribed frames relative to the candidate circumscribed frame corresponding to the maximum probability, and set a probability that a target in a candidate circumscribed frame whose overlapping rate is greater than a first preset threshold belongs to the preset categories to zero.

Figure 4:
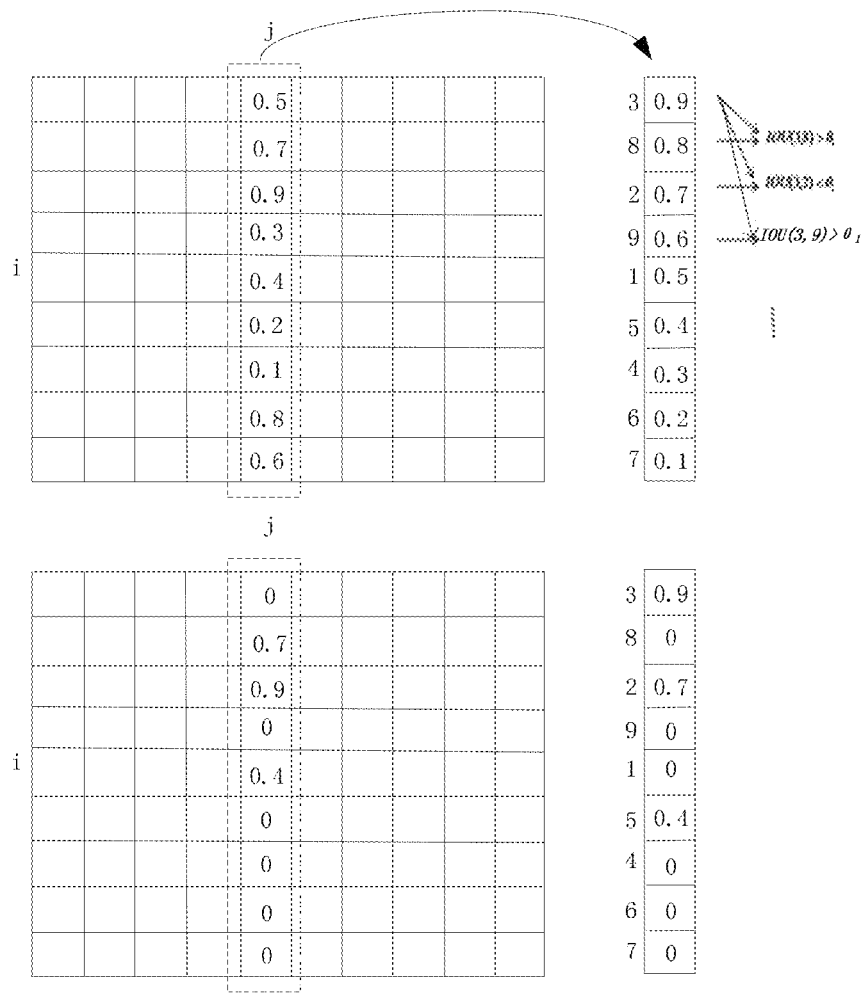
FIG. 4 is a schematic diagram of performing a deduplication processing step on a candidate circumscribed frame in an embodiment of a target determining method according to the present invention.

For example, if there are i candidate circumscribed frames, and a quantity of preset categories is j, it is assumed that a probability that the $i^{th}$ candidate circumscribed frame belongs to the $i^{th}$ preset category is $P_{ij}$. For each preset category j, sorting is performed according to $P_{ij}$, a candidate circumscribed frame corresponding to a large $P_{ij}$ is arranged in front, and a candidate circumscribed frame corresponding to a small $P_{ij}$ is arranged behind. Referring to FIG. 4, for a same preset category j, overlapping rates IOU of other candidate circumscribed frames behind a candidate circumscribed frame corresponding to a maximum $P_{ij}$ relative to the candidate circumscribed frame corresponding to the maximum $P_{ij}$ are sequentially calculated, and if the overlapping rates IOU are greater than a first preset threshold $\theta_1$, probabilities that the subsequent candidate circumscribed frames belong to the preset category j are set to 0. An overlapping rate IOU represents an extent of overlapping between two candidate circumscribed frames, and a larger overlapping rate indicates that two candidate circumscribed frames are more similar. When an overlapping rate of two candidate circumscribed frames is greater than the first preset threshold $\theta_1$, it indicates that a similarity of the two candidate circumscribed frames is relatively high. To simplify calculation, a candidate circumscribed frame corresponding to a relatively small probability is removed, and the first preset threshold $\theta_1$ may be set according to an actual application situation. A formula (1) may be adopted for an overlapping rate IOU.

$$IOU = \frac{S_{12}}{S_1 + S_2 - S_{12}} \quad (1)$$

where $S_1$ and $S_2$ separately represent areas of two candidate circumscribed frames, and $S_{12}$ is an area of an overlapping part of the two.

Step 2: For other preset categories, repeat step 1.

That is, the foregoing deduplication processing in step 1 is performed for each of remaining preset categories.

Step 3: For each candidate circumscribed frame remaining after step 2 is completed, obtain a preset category corresponding to a maximum probability of probabilities that a target in the candidate circumscribed frame belongs to the preset categories to serve as a category of the target in the candidate circumscribed frame, and use a target whose maximum probability is greater than a second preset threshold $\theta_2$ as a possible target image.

For the candidate circumscribed frames remaining after the deduplication processing through step 1 and step 2, a maximum value $P_i = \max(P_{ij})$ of probabilities that a target in each candidate circumscribed frame belongs to the preset categories is sequentially calculated, and a corresponding preset category j is recorded. A target whose $P_i$ value is greater than the second preset threshold $\theta_2$ is selected as a possible target image, and a preset category j corresponding to the target is recorded as a category of the possible target image.

A probability value $P_i$ represents a probability that a target belongs to a category of the target. If the $P_i$ value is larger, a probability that the target belongs to the category is larger. If the $P_i$ value is greater than the second preset threshold $\theta_2$, it indicates that a probability that a candidate circumscribed frame belongs to the category of the target is relatively large. To further simplify calculation, a candidate circumscribed frame corresponding to a target whose $P_i$ is less than the second preset threshold $\theta_2$ is removed, and a value of the second preset threshold $\theta_2$ may be set according to an actual application situation.

Step 4: Calculate a distance coefficient of the possible target image relative to a click location of the user 30, where the distance coefficient δ is represented as:

$$\delta = \begin{cases} \min\left(10/\sqrt{(x_p - x_o)^2 + \sqrt{(y_p - y_o)^2}}, 1\right) & \text{if } (x_p, y_p) \text{ is in a candidate image} \\ 5/\sqrt{(x_p - x_o)^2 + \sqrt{(y_p - y_o)^2}} & \text{if } (x_p, y_p) \text{ is out of a candidate image} \end{cases}$$

where coordinate of the possible target image is $(x_o, y_o)$, and coordinate of the click location is $(x_p, y_p)$.

A distance coefficient δ represents a distance from a candidate circumscribed frame to a click location of the user 30, a larger δ indicates that a candidate circumscribed frame is closer to a click location of the user 30, and a smaller δ indicates that a candidate circumscribed frame is farther away from a click location of the user 30.

The distance coefficient calculation formula may be used to distinguish targets of a same category, and even if a click location of the user 30 occurs out of a target image, a target can still be accurately framed.

Step 5: Obtain products $\varepsilon_i$ of distance coefficients of possible target images and probabilities corresponding to categories of the possible target images and find a maximum value $\max(\varepsilon_i)$ of the products; and if the maximum value $\max(\varepsilon_i)$ is greater than a third preset threshold $\theta_3$, use a possible target image corresponding to the maximum value $\max(\varepsilon_i)$ of the products as the target image, and recording a category of the target image.

That is, determining values $\varepsilon_i = P_i \delta_i$ of possible target images are calculated, and a maximum value $\varepsilon = \max(\varepsilon_i)$ of the determining values of the possible target images is obtained. If ε is greater than the third preset threshold $\theta_3$, a possible target image corresponding to ε is used as a target image, and a category of the target image is recorded. If ε is not greater than the third preset threshold $\theta_3$, it indicates that no target that the user 30 needs to track exists nearby a click location of the user 30, a reminder may be sent from the end of the electronic device 20, and the user 30 is requested to reselect a target.

A determining value ε represents a distance from a possible target image to a click location of the user 30 and a probability that the possible target image belongs to a category of the possible target image. If the value ε is larger, the possible target image is closer to a click location of the user 30 and the probability that the possible target image belongs to the category of the possible target image is larger. If the value ε is greater than the third preset threshold $θ_3$, it indicates that the possible target image is relatively close to the click location of the user 30 and the probability that the possible target image belongs to the category of the possible target image is relatively large, the possible target image may be used as a target image, and a value of the third preset threshold $θ_3$ may be set according to an actual application situation.

Optionally, in other embodiments of the method, after a target image and a category of the target image are confirmed, a flight policy may be adjusted according to the category of the target image. For example, if a target is a large target that is rapidly moving such as a vehicle, the unmanned aerial vehicle 10 needs to improve a flight height and a flight speed of the unmanned aerial vehicle 10, so as to obtain a larger field of view and a higher tracking speed. However, if a target is a small target such as a person, the unmanned aerial vehicle 10 needs to reduce a height and a speed, so as to ensure that the target is not lost in a field of view although the target is excessively small.

According to this embodiment of the present invention, a region picture in which a user is interested is obtained on an original image according to a click location of the user 30, and the region picture in which the user is interested is used as an input to a deep-learning based network model to perform target prediction, so that a calculation amount is small, an operation time is short, and requirements on hardware devices are low.

Figure 6:
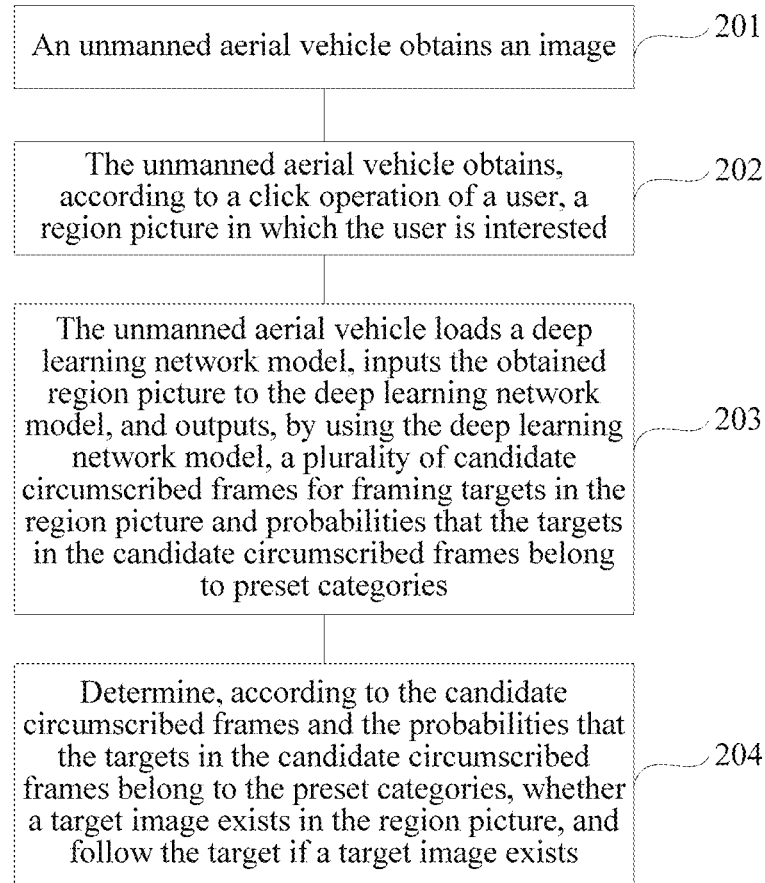
FIG. 6 is a schematic flowchart of an embodiment of a target determining method according to the present invention performed by an unmanned aerial vehicle.

An embodiment of the present invention further provides another method for determining a target through intelligent following of an unmanned aerial vehicle, which may be performed by the unmanned aerial vehicle 10 in FIG. 1. As shown in FIG. 6, the method includes the following steps.

201: The unmanned aerial vehicle 10 obtains an image.

The unmanned aerial vehicle 10 collects an image by using an image collection apparatus.

202: The unmanned aerial vehicle 10 obtains, according to a click operation of a user 30, a region picture in which the user is interested.

The unmanned aerial vehicle 10 returns a collected original image to an electronic device 20 by using a wireless network, and may obtain, according to a click operation of the user 30 on the original image, a region picture in which the user 30 is interested. The electronic device 20 may obtain, according to a click operation of the user 30, a region picture in which the user 30 is interested, and then return the region picture in which the user 30 is interested to the unmanned aerial vehicle 10. Alternatively, the electronic device 20 sends only a click location of the user 30 to the unmanned aerial vehicle 10, and the unmanned aerial vehicle 10 obtains, from the original image according to the click location of the user 30, a region picture in which the user 30 is interested.

203: The unmanned aerial vehicle 10 loads a deep learning network model, inputs the obtained region picture to the deep learning network model, and outputs, by using the deep learning network model, a plurality of candidate circumscribed frames for framing targets in the region picture and probabilities that the targets in the candidate circumscribed frames belong to preset categories.

204: Determine, according to the candidate circumscribed frames and the probabilities that the targets in the candidate circumscribed frames belong to the preset categories, whether a target image exists in the region picture; and follow the target if a target image exists.

Optionally, in other embodiments of the method, if no target image exists, the unmanned aerial vehicle 10 sends an instruction to the electronic device 20, where the instruction is used to remind the user that no target in which the user 30 is interested exists in the image. The instruction may be further used to remind the user to re-click the image to reselect a target in which the user is interested.

For technical details about step 203 and step 204, respectively refer to descriptions of step 103 and step 104. Details are not described herein again. Optionally, in some embodiments of the foregoing method, the deep-learning based network model includes at least two convolutional layers and at least two sampling layers. Specifically, the deep learning network model 300 shown in FIG. 5 may be adopted. For a specific structure and technical details of the deep learning network model, refer to the foregoing introduction about the deep-learning based network model. Details are not described herein again either.

According to this embodiment of the present invention, a region picture in which a user 30 is interested is obtained, and the region picture in which the user is interested may be used as an input of a deep-learning based network model to perform target prediction, so that a calculation amount is small, an operation time is short, and requirements on hardware devices are low.

Figure 7:
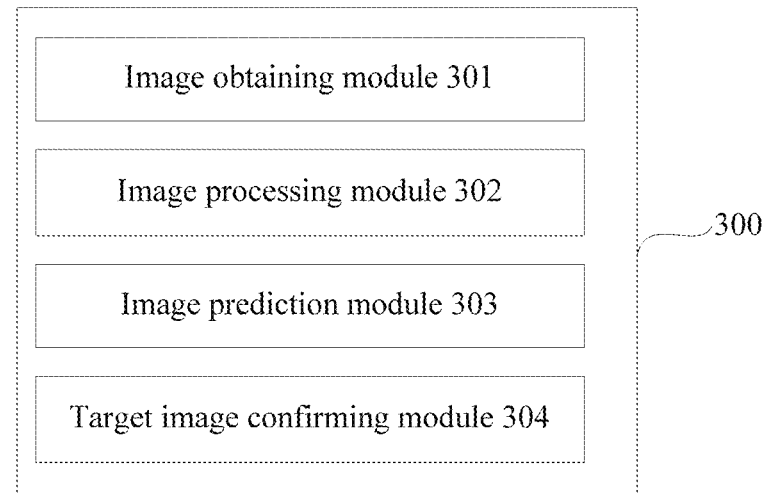
FIG. 7 is a schematic structural diagram of an embodiment of a target determining apparatus according to the present invention.

Correspondingly, as shown in FIG. 7, an embodiment of the present invention further provides an apparatus for determining a target through intelligent following of an unmanned aerial vehicle, applied to an electronic device 20. The apparatus 300 includes:

an image obtaining module 301, configured to obtain an image returned by the unmanned aerial vehicle 10;

an image processing module 302, configured to obtain, according to a click of a user 30 on the image returned by the unmanned aerial vehicle 10, a region picture in which the user is interested;

an image prediction module 303, configured to load a deep learning network model, input the obtained region picture to the deep learning network model, and output, by using the deep learning network model, a plurality of candidate circumscribed frames for framing targets in the region picture and probabilities that the targets in the candidate circumscribed frames belong to preset categories; and a target image confirming module 304, configured to determine, according to the candidate circumscribed frames and the probabilities that the targets in the candidate circumscribed frames belong to the preset categories, whether a target image exists in the region picture; and send a target following command to the unmanned aerial vehicle if a target image exists.

Optionally, in other embodiments of the apparatus, the target image confirming module 304 is further configured to remind, if no target image exists, the user that no target in which the user is interested exists in the image. The target image confirming module 304 may further remind the user to re-click the image to reselect a target in which the user is interested.

According to this embodiment of the present invention, a region picture in which a user is interested is obtained on an original image according to a click location of the user 30, and the region picture in which the user is interested is used as an input to a deep-learning based network model to perform target prediction, so that a calculation amount is small, an operation time is short, and requirements on hardware devices are low.

Optionally, in some embodiments of the apparatus, the target image confirming module 304 is specifically configured to:

S1: for each of the preset categories, obtain a candidate circumscribed frame corresponding to a target whose probability of belonging to the preset categories is maximum, separately calculate overlapping rates of other candidate circumscribed frames relative to the candidate circumscribed frame, and set a probability that a target in a candidate circumscribed frame whose overlapping rate is greater than a first preset threshold belongs to the preset categories to zero;

S2: for other preset categories, repeat step S1;

S3: for each candidate circumscribed frame remaining after step S2 is completed, obtain a preset category corresponding to a maximum probability of probabilities that a target in the candidate circumscribed frame belongs to the preset categories to serve as a category of the target in the candidate circumscribed frame, and use a target whose maximum probability is greater than a second preset threshold $\theta_2$ as a possible target image;

S4: calculate a distance coefficient of the possible target image relative to a click location of the user 30, where the distance coefficient δ is represented as:

$$\delta = \begin{cases} \min\left(10/\sqrt{(x_p - x_o)^2 + \sqrt{(y_p - y_o)^2}}, 1\right) & \text{if } (x_p, y_p) \text{ is in a candidate circumscribed frame} \\ 5/\sqrt{(x_p - x_o)^2 + \sqrt{(y_p - y_o)^2}} & \text{if } (x_p, y_p) \text{ is out of a candidate circumscribed frame} \end{cases}$$

where coordinate of the possible target image is $(x_o, y_o)$, and coordinate of the click location is $(x_p, y_p)$; and S5: obtain products $\varepsilon_i$ of distance coefficients of possible target images and probabilities corresponding to categories of the possible target images and find a maximum value $\max(\varepsilon_i)$ of the products; and if the maximum value $\max(\varepsilon_i)$ is greater than a third preset threshold $\theta_3$, use a possible target image corresponding to the maximum value $\max(\varepsilon_i)$ of the products as the target image, and recording a category of the target image.

Optionally, in some embodiments of the apparatus, the deep learning network model includes at least two convolutional layers and at least two sampling layers. Specifically, the deep learning network model includes:

a first convolutional layer, a first downsampling layer, a second convolutional layer, a second downsampling layer, a third convolutional layer, a third downsampling layer, a fourth convolutional layer, a fourth downsampling layer, a fifth convolutional layer, a fifth downsampling layer, a sixth convolutional layer, a sixth downsampling layer, a seventh convolutional layer, an eighth convolutional layer and a region layer.

Optionally, among the first convolutional layer, the second convolutional layer, the third convolutional layer, the fourth convolutional layer, the fifth convolutional layer and the sixth convolutional layer, a filter quantity of a next convolutional layer is two times a filter quantity of a previous convolutional layer, and a filter quantity of the sixth convolutional layer is equal to that of the seventh convolutional layer; and the first downsampling layer, the second downsampling layer, the third downsampling layer, the fourth downsampling layer and the fifth downsampling layer have a window size of 2×2 pixels and a skip interval of 2, and the sixth downsampling layer has a window size of 2×2 pixels and a skip interval of 1.

Optionally, a filter quantity of the first convolutional layer is 4, and a maximum downsampling method is adopted for all of the first downsampling layer, the second downsampling layer, the third downsampling layer, the fourth downsampling layer, the fifth downsampling layer and the sixth downsampling layer.

Optionally, a filter of 3×3 pixels is used for each of the convolutional layers.

Optionally, in some embodiments of the apparatus, the region picture has a size of 288×288 pixels, and totally 9×9×5 candidate circumscribed frames are obtaining by using the deep learning network model.

Figure 8:
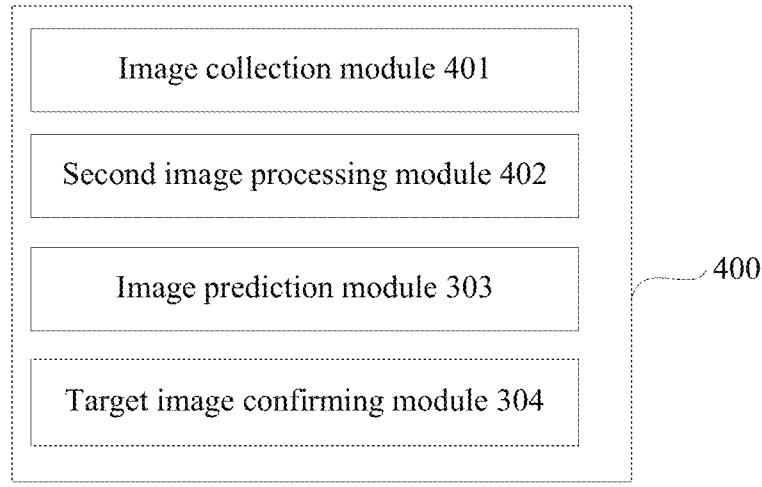
FIG. 8 is a schematic structural diagram of an embodiment of a target determining apparatus according to the present invention.

Correspondingly, as shown in FIG. 8, an embodiment of the present invention further provides an apparatus for determining a target through intelligent following of an unmanned aerial vehicle, applied to an unmanned aerial vehicle 10. The apparatus 400 includes:

an image collection module 401, configured to obtain an image;

a second image processing module 402, configured to obtain, according to a click operation of a user 30, a region picture in which the user is interested;

an image prediction module 303, configured to load a deep learning network model, input the obtained region picture to the deep learning network model, and output, by using the deep learning network model, a plurality of candidate circumscribed frames for framing targets in the region picture and probabilities that the targets in the candidate circumscribed frames belong to preset categories; and a target image confirming module 304, configured to determine, according to the candidate circumscribed frames and the probabilities that the targets in the candidate circumscribed frames belong to the preset categories, whether a target image exists in the region picture; and follow the target if a target image exists.

Optionally, in other embodiments of the apparatus, if no target image exists, the unmanned aerial vehicle 10 sends an instruction to the electronic device 20, where the instruction is used to remind the user that no target in which the user 30 is interested exists in the image. The instruction may be further used to remind the user to re-click the image to reselect a target in which the user is interested.

For technical details about the image prediction module 303 and the target image confirming module 304, respectively refer to the image prediction module 303 and the target image confirming module 304 in the apparatus 300 for determining a target through intelligent following of an unmanned aerial vehicle. Details are not described herein again. Optionally, in some embodiments of the foregoing apparatus, the deep-learning based network model includes at least two convolutional layers and at least two sampling layers. Specifically, the deep learning network model 300 shown in FIG. 5 may be adopted. For a specific structure and technical details of the deep learning network model, refer to the foregoing introduction about the deep-learning based network model. Details are not described herein again either.

According to this embodiment of the present invention, a region picture in which a user 30 is interested is obtained, and the region picture in which the user is interested may be used as an input of a deep-learning based network model to perform target prediction, so that a calculation amount is small, an operation time is short, and requirements on hardware devices are low.

It should be noted that, the foregoing apparatus may perform the method provided in the embodiments of the present application, and has corresponding functional modules for performing the method and beneficial effects. For technical details not described exhaustively in the embodiment of the apparatus, refer to the method provided in the embodiment of the present application.

Figure 9:
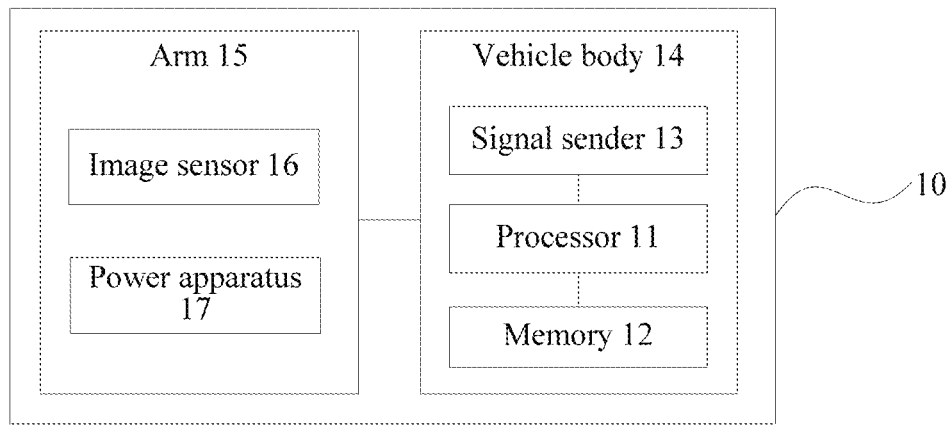
FIG. 9 is a schematic diagram of a hardware structure of an unmanned aerial vehicle according to an embodiment of the present invention.

FIG. 9 is a schematic diagram of a hardware structure of an unmanned aerial vehicle 10 according to an embodiment of the present invention. As shown in FIG. 9, the unmanned aerial vehicle 10 includes: a vehicle body 14, an arm 15 connected to the vehicle body 14, a power apparatus 17 disposed at the arm, an image sensor 16 configured to obtain an image, a processor 11 disposed in the vehicle body 14, a signal sender 13 and a memory 12 that is disposed inside or outside the unmanned aerial vehicle 10 (in FIG. 9, an example in which the memory 12 is disposed inside the unmanned aerial vehicle 10 is used).

The processor 11 may be connected to the memory 12 by using a bus or in another manner.

The memory 12 as a non-volatile computer readable storage medium may be configured to store a non-volatile software program, a non-volatile computer executable program and a module, for example, a program instruction/unit corresponding to the target determining method in the embodiments of the present invention (for example, the image collection module 401, the second image processing module 402, the image prediction module 303 and the target image confirming module 304 shown in FIG. 8). The processor 11 runs the non-volatile software program, instruction and unit stored in the memory 12, so as to perform various function applications and data processing of the unmanned aerial vehicle 10, that is, implement the target determining method in the foregoing method embodiments.

The memory 12 may include a program storage region and a data storage region, where the program storage region may store an operating system and an application program required by at least one function; and the data storage region may store data created according to use of the user terminal device or the like. Moreover, the memory 12 may include a high-speed random access memory and may further include a non-volatile memory, for example, at least one magnetic disk storage device, a flash memory device or another non-volatile solid-state storage device. In some embodiments, the memory 12 optionally includes memories disposed remotely relative to the processor 11 and these remote memories may be connected to the unmanned aerial vehicle 10 by using a network.

The one or more modules are stored in the memory 12. When being executed by the one or more processors 11, the one or more units perform the target determining method in any of the foregoing method embodiments, for example, perform the method steps 201 to 204 in FIG. 6 described above and implement functions of the image collection module 401, the second image processing module 402, the image prediction module 303 and the target image confirming module 304 in FIG. 8.

If the unmanned aerial vehicle 10 determines, by using the target determining method, that a target image exists, the target is followed. Optionally, if no target image exists, the unmanned aerial vehicle 10 sends an instruction to the electronic device 20, where the instruction is used to remind the user that no target in which the user is interested exists in the image. The instruction may be further used to remind the user to re-click the image to reselect a target in which the user is interested.

The foregoing unmanned aerial vehicle 10 may perform the target determining method provided in the embodiments of the present invention, and has corresponding functional modules for performing the method and beneficial effects. For technical details not described exhaustively in the embodiment of the unmanned aerial vehicle 10, refer to the target determining method provided in the embodiments of the present invention.

An embodiment of the present invention further provides a non-volatile computer readable storage medium, the computer readable storage medium stores computer executable instructions and the computer executable instructions are executed by one or more processors, so as to, for example, perform the method steps 201 to 204 in FIG. 6 described above and implement functions of the image collection module 401, the second image processing module 402, the image prediction module 303 and the target image confirming module 304 in FIG. 8.

Figure 10:
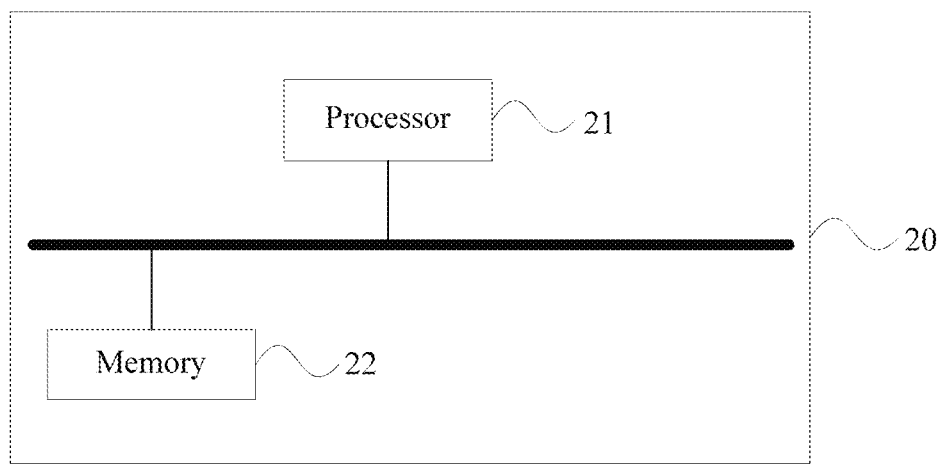
FIG. 10 is a schematic diagram of a hardware structure of an electronic device according to an embodiment of the present invention.

FIG. 10 is a schematic diagram of a hardware structure of an electronic device 20 according to an embodiment of the present invention. As shown in FIG. 10, the electronic device 20 includes:

one or more processor 21 and a memory 22. In FIG. 10, one processor 21 is used as an example.

The processor 21 may be connected to the memory 22 by using a bus or in another manner. In FIG. 10, a connection performed by using a bus is used as an example.

The memory 22 as a non-volatile computer readable storage medium may be configured to store a non-volatile software program, a non-volatile computer executable program and a module, for example, a program instruction/unit corresponding to the target determining method in the embodiments of the present invention (for example, the image obtaining module 301, the image processing module 302, the image prediction module 303 and the target image confirming module 304 shown in FIG. 7). The processor 21 runs the non-volatile software program, instruction and unit stored in the memory 22, so as to perform various function applications and data processing of the electronic device 20, that is, implement the target determining method in the foregoing method embodiments.

The memory 22 may include a program storage region and a data storage region, where the program storage region may store an operating system and an application program required by at least one function; and the data storage region may store data created according to use of the electronic device 20 or the like. Moreover, the memory 22 may include a high-speed random access memory and may further include a non-volatile memory, for example, at least one magnetic disk storage device, a flash memory device or another non-volatile solid-state storage device. In some embodiments, the memory 22 optionally includes memories disposed remotely relative to the processor 21 and these remote memories may be connected to the electronic device by using a network. Examples of the foregoing network include but are not limited to the Internet, an intranet, a local region network, a mobile communications network and a combination thereof.

The one or more units are stored in the memory 22. When being executed by the one or more processors 21, the one or more units perform the target determining method in any of the foregoing method embodiments, for example, perform the method steps 101 to 104 in FIG. 2 described above and implement functions of the image obtaining module 301, the image processing module 302, the image prediction module 303 and the target image confirming module 304 shown in FIG. 7.

The foregoing electronic device 20 may perform the target determining method provided in the embodiments of the present invention, and has corresponding functional modules for performing the method and beneficial effects. For technical details not described exhaustively in the embodiment of the electronic device 20, refer to the target determining method provided in the embodiments of the present invention.

The electronic device 20 of this embodiment of the present application exists in a plurality of forms, including but being not limited to:

(1) Remote control.

(2) Mobile communications device: such device is characterized by having a mobile communication function, and mainly aims to provide speech and data communication. Such terminal includes a smartphone (for example, iPhone), a multimedia mobile phone, a feature phone, a low-end mobile phone and the like.

(3) Ultra mobile personal computer device: such device falls within a personal computer, has computing and processing functions and generally also has a mobile Internet access characteristic. Such terminal includes: a PDA, a MID and a UMPC device, for example, an iPad.

(4) Portable entertainment device: such device may display and play multimedia content. Such device includes: an audio and video player (for example, an iPod), a handheld game console, an electronic book, an intelligent toy and a portable vehicle-mounted navigation device.

(5) Server: the server is a device providing a computing service and includes components such as a processor, a hard disk, a memory and a system bus. The server has an architecture similar to that of a general-purpose computer, but because the server needs to provide a highly reliable service, the server has relatively high requirements in aspects such as a processing capability, stability, reliability, safety, extendibility, and manageability.

Figure 11:
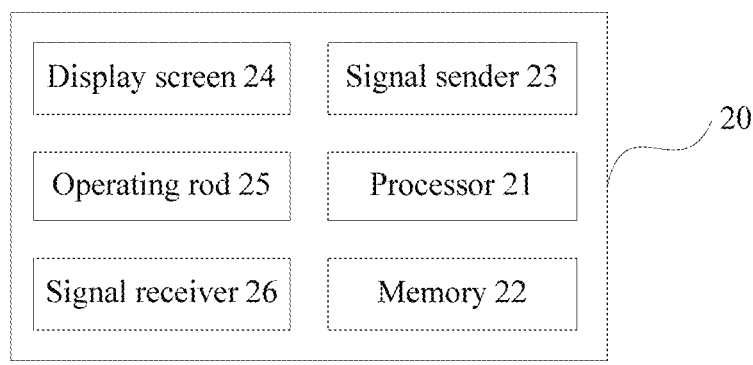
FIG. 11 is a schematic diagram of a hardware structure of a remote control according to an embodiment of the present invention.

The electronic device 20 may be a remote control shown in FIG. 11, and in addition to the processor 21 and the memory 22, the remote control further includes an operating rod 25, a signal receiver 26, a signal sender 23 and a display screen 24, where the signal receiver 26 is configured to receive an image returned by an unmanned aerial vehicle 10, and the signal sender 23 is configured to send an instruction to the unmanned aerial vehicle 10.

If the remote control determines, by using the target determining method, that a target image exists, a target following command is sent to the unmanned aerial vehicle 10 by using the signal sender 23. Optionally, if no target image exists, the display screen 24 displays a reminder that no target in which the user is interested exists in the image, and the display screen 24 may further display a reminder of re-clicking the image to reselect a target in which the user is interested.

An embodiment of the present invention further provides a non-volatile computer readable storage medium, the computer readable storage medium stores computer executable instructions and the computer executable instructions are executed by one or more processors, so as to, for example, perform the method steps 101 to 104 in FIG. 2 described above and implement functions of the image obtaining module 301, the image processing module 302, the image prediction module 303 and the target image confirming module 304 shown in FIG. 7.

The foregoing apparatus embodiments are merely exemplary, and units described as separate components may be or may not be physically separated. Components shown as units may be or may not be physical units, that is, may be integrated or distributed to a plurality of network units. A part of or all of the modules may be selected according to the actual needs to achieve the objectives of the solutions of the embodiments.

Through the descriptions of the preceding embodiments, a person of ordinary skill in the art may understand that the embodiments may be implemented by using hardware only or by using software and a universal hardware platform. Persons of ordinary skill in the art should understand that all or a part of the processes of the method according to the embodiments of the present invention may be implemented by a program instructing relevant hardware. The program may be stored in a computer readable storage medium. When the program is run, the processes of the method according to the embodiments of the present invention are performed. The storage medium may be a magnetic disk, an optical disc, a Read-Only Memory (ROM), or a Random Access Memory (RAM).

Finally, it should be noted that, the foregoing embodiments are merely used for illustrating rather than limiting the technical solutions of the present invention. According to the idea of the present invention, technical features in the foregoing embodiments or in different embodiments may also be combined. Steps may be implemented in any order and there exist many other changes on different aspects of the present invention described above. For brevity, the changes are not provided in details. Although the present invention is described in detail according to the foregoing embodiments, persons of ordinary skill in the art should understand that modifications may be made on the technical solutions recorded in the foregoing embodiments or equivalent replacements may be made on some of the technical features therein. These modifications or replacements do not cause the essence of the corresponding technical solutions to depart from the scope of the technical solutions of the embodiments of the present invention.

What is claimed is:

1. A method for determining a target through intelligent following of an unmanned aerial vehicle, applied to an electronic device, wherein the method comprises:
   obtaining, by the electronic device, an image returned by an unmanned aerial vehicle;
   obtaining, by the electronic device according to a click of a user on the image returned by the unmanned aerial vehicle, a region picture in which the user is interested;
   loading, by the electronic device, a deep learning network model, inputting the obtained region picture to the deep learning network model, and outputting, by using the deep learning network model, a plurality of candidate circumscribed frames for framing targets in the region picture and probabilities that the targets in the candidate circumscribed frames belong to preset categories;
   determining, according to the candidate circumscribed frames and the probabilities that the targets in the candidate circumscribed frames belong to the preset categories, whether a target image exists in the region picture; and
   sending a target following command to the unmanned aerial vehicle if a target image exists;
   wherein the determining, according to the candidate circumscribed frames and the probabilities that the targets in the candidate circumscribed frames belong to the preset categories, whether the target image exists in the region picture comprises:

S1: for each of the preset categories, obtaining a candidate circumscribed frame corresponding to a target whose probability of belonging to the preset categories is maximum, separately calculating overlapping rates of other candidate circumscribed frames relative to the candidate circumscribed frame, and setting a probability that a target in a candidate circumscribed frame whose overlapping rate is greater than a first preset threshold belongs to the preset categories to zero;

S2: for other preset categories, repeating step S1;

S3: for each candidate circumscribed frame remaining after executing step S2, obtaining a preset category corresponding to a maximum probability of probabilities that a target in the candidate circumscribed frame belongs to the preset categories to serve as a category of the target in the candidate circumscribed frame, and using a target whose maximum probability is greater than a second preset threshold as a possible target image;

S4: calculating a distance coefficient of the possible target image relative to a click location of the user, wherein the distance coefficient $\delta$ is represented as:

$$\delta = \begin{cases} \min\left(10/\sqrt{(x_p - x_o)^2 + \sqrt{(y_p - y_o)^2}}, 1\right) & \text{if } (x_p, y_p) \text{ is in a candidate circumscribed frame} \\ 5/\sqrt{(x_p - x_o)^2 + \sqrt{(y_p - y_o)^2}} & \text{if } (x_p, y_p) \text{ is out of a candidate circumscribed frame} \end{cases}$$

wherein coordinate of the possible target image is $(x_o, y_o)$, and coordinate of the click location is $(x_p, y_p)$; and S5, obtaining products of distance coefficients of possible target images and probabilities corresponding to categories of the possible target images and finding a maximum value of the products; and if the maximum value is greater than a third preset threshold, using a possible target image corresponding to the maximum value of the products as the target image, and recording a category of the target image.

2. The method according to claim 1, wherein the method further comprises:
reminding, by the electronic device if no target image exists, the user that no target in which the user is interested exists in the image.

3. The method according to claim 1, wherein the method further comprises:
reminding, by the electronic device if no target image exists, the user to re-click the image to reselect a target in which the user is interested.

4. The method according to claim 1, wherein the deep learning network model comprises at least two convolutional layers and at least two sampling layers.

5. The method according to claim 1, wherein the deep learning network model sequentially comprises:
a first convolutional layer, a first downsampling layer, a second convolutional layer, a second downsampling layer, a third convolutional layer, a third downsampling layer, a fourth convolutional layer, a fourth downsampling layer, a fifth convolutional layer, a fifth downsampling layer, a sixth convolutional layer, a sixth downsampling layer, a seventh convolutional layer, an eighth convolutional layer and a region layer.

6. The method according to claim 5, wherein among the first convolutional layer, the second convolutional layer, the third convolutional layer, the fourth convolutional layer, the fifth convolutional layer and the sixth convolutional layer, a filter quantity of a next convolutional layer is two times a filter quantity of a previous convolutional layer, and a filter quantity of the sixth convolutional layer is equal to that of the seventh convolutional layer; and
the first downsampling layer, the second downsampling layer, the third downsampling layer, the fourth downsampling layer and the fifth downsampling layer have a window size of 2×2 pixels and a skip interval of 2, and the sixth downsampling layer has a window size of 2×2 pixels and a skip interval of 1.

7. The method according to claim 5, wherein a filter quantity of the first convolutional layer is 4, and a maximum downsampling method is adopted for all of the first downsampling layer, the second downsampling layer, the third downsampling layer, the fourth downsampling layer, the fifth downsampling layer and the sixth downsampling layer.

8. The method according to claim 4, wherein a filter of 3×3 pixels is used for each of the convolutional layers.

9. The method according to claim 1, wherein the region picture has a size of 288×288 pixels, and totally 9×9×5 candidate circumscribed frames are obtaining by using the deep learning network model.

10. A method for determining a target through intelligent following of an unmanned aerial vehicle, applied to an unmanned aerial vehicle, wherein the method comprises:
obtaining, by the unmanned aerial vehicle, an image;
obtaining, by the unmanned aerial vehicle according to a click operation of a user, a region picture in which the user is interested;
loading, by the unmanned aerial vehicle, a deep learning network model, inputting the obtained region picture to the deep learning network model, and outputting, by using the deep learning network model, a plurality of candidate circumscribed frames for framing targets in the region picture and probabilities that the targets in the candidate circumscribed frames belong to preset categories;
determining, according to the candidate circumscribed frames and the probabilities that the targets in the candidate circumscribed frames belong to the preset categories, whether a target image exists in the region picture; and
following the target if a target image exists,
wherein the determining, according to the candidate circumscribed frames and the probabilities that the targets in the candidate circumscribed frames belong to the preset categories, whether the target image exists in the region picture comprises:

S1: for each of the preset categories, obtaining a candidate circumscribed frame corresponding to a target whose probability of belonging to the preset categories is maximum, separately calculating overlapping rates of other candidate circumscribed frames relative to the candidate circumscribed frame, and setting a probability that a target in a candidate circumscribed frame whose overlapping rate is greater than a first preset threshold belongs to the preset categories to zero;

S2: for other preset categories, repeating step S1;

S3: for each candidate circumscribed frame remaining after executing step S2, obtaining a preset category corresponding to a maximum probability of probabilities that a target in the candidate circumscribed frame belongs to the preset categories to serve as a category of the target in the candidate circumscribed frame, and using a target whose maximum probability is greater than a second preset threshold as a possible target image;

S4: calculating a distance coefficient of the possible target image relative to a click location of the user, wherein the distance coefficient δ is represented as:

$$\delta = \begin{cases} \min\left(10/\sqrt{(x_p-x_o)^2 + (y_p-y_o)^2}, 1\right) & \text{if } (x_p, y_p) \text{ is in a candidate image} \\ 5/\sqrt{(x_p-x_o)^2 + (y_p-y_o)^2} & \text{if } (x_p, y_p) \text{ is out of a candidate image} \end{cases};$$

wherein coordinate of the possible target image is $(x_o, y_o)$, and coordinate of the click location is $(x_p, y_p)$; and S5, obtaining products of distance coefficients of possible target images and probabilities corresponding to categories of the possible target images and finding a maximum value of the products; and if the maximum value is greater than a third preset threshold, using a possible target image corresponding to the maximum value of the products as the target image, and recording a category of the target image.

11. The method according to claim 10, wherein the method further comprises:
sending, by the unmanned aerial vehicle if no target image exists, an instruction to an electronic device, wherein the instruction is used to remind the user that no target in which the user is interested exists in the image.

12. The method according to claim 10, wherein the instruction is further used to remind the user to re-click the image to reselect a target in which the user is interested.

13. The method according to claim 10, wherein the deep learning network model comprises at least two convolutional layers and at least two sampling layers.

14. The method according to claim 13, wherein the deep learning network model sequentially comprises:
a first convolutional layer, a first downsampling layer, a second convolutional layer, a second downsampling layer, a third convolutional layer, a third downsampling layer, a fourth convolutional layer, a fourth downsampling layer, a fifth convolutional layer, a fifth downsampling layer, a sixth convolutional layer, a sixth downsampling layer, a seventh convolutional layer, an eighth convolutional layer and a region layer.

15. The method according to claim 14, wherein among the first convolutional layer, the second convolutional layer, the third convolutional layer, the fourth convolutional layer, the fifth convolutional layer and the sixth convolutional layer, a filter quantity of a next convolutional layer is two times a filter quantity of a previous convolutional layer, and a filter quantity of the sixth convolutional layer is equal to that of the seventh convolutional layer; and
the first downsampling layer, the second downsampling layer, the third downsampling layer, the fourth downsampling layer and the fifth downsampling layer have a window size of 2×2 pixels and a skip interval of 2, and the sixth downsampling layer has a window size of 2×2 pixels and a skip interval of 1.

16. The method according to claim 14, wherein a filter quantity of the first convolutional layer is 4, and a maximum downsampling method is adopted for all of the first downsampling layer, the second downsampling layer, the third downsampling layer, the fourth downsampling layer, the fifth downsampling layer and the sixth downsampling layer.

17. The method according to claim 13, wherein a filter of 3×3 pixels is used for each of the convolutional layers.

18. The method according to claim 10, wherein the region picture has a size of 288×288 pixels, and totally 9×9×5 candidate circumscribed frames are obtaining by using the deep learning network model.

* * * * *